No. 816,424. PATENTED MAR. 27, 1906.
T. BEMIS.
ADJUSTABLE FENCE FOR SAWS.
APPLICATION FILED JUNE 30, 1905.
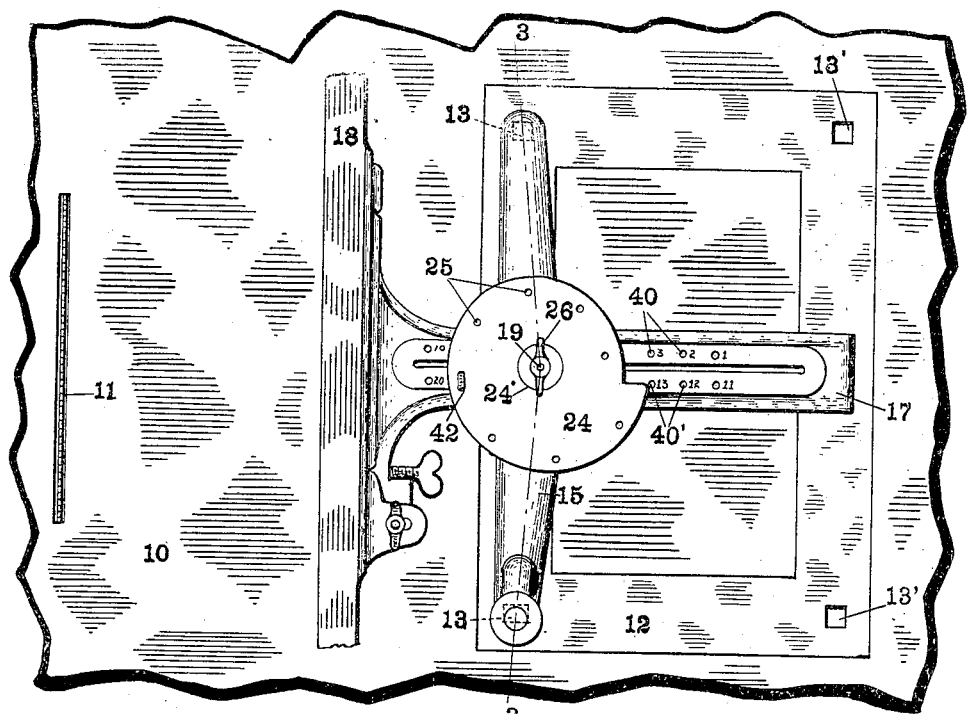
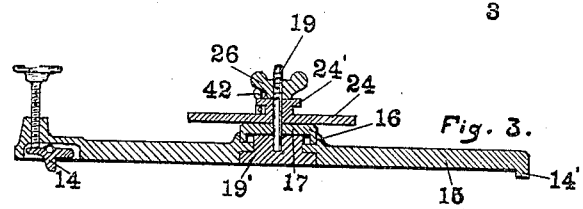
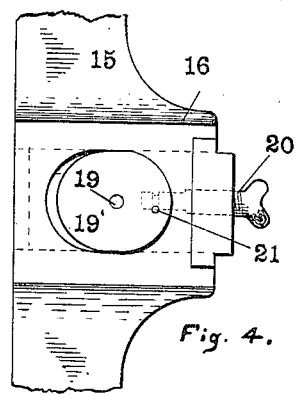
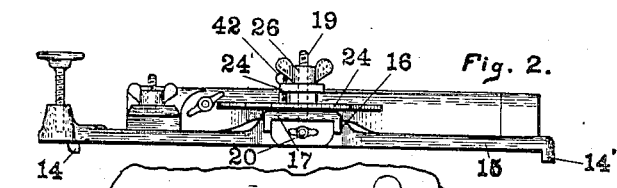
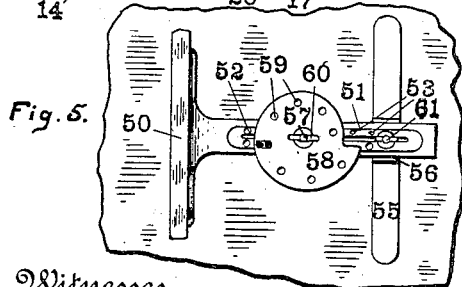
Witnesses
J. A. Walsh
Ruth Worthington
Inventor
Thomas Bemis.
By
Bradford & Hood.
Attorneys

UNITED STATES PATENT OFFICE.

THOMAS BEMIS, OF INDIANAPOLIS, INDIANA.

ADJUSTABLE FENCE FOR SAWS.

No. 816,424.     Specification of Letters Patent.     Patented March 27, 1906.

Application filed June 30, 1905. Serial No. 267,832.

*To all whom it may concern:*

Be it known that I, THOMAS BEMIS, a citizen of the United States, residing at Indianapolis, in the county of Marion and State of Indiana, have invented certain new and useful Improvements in Adjustable Fences for Saws, of which the following is a specification.

The object of my invention is to provide means by which the adjustable fence or guide of a saw or cutter may be easily and quickly accurately adjusted.

The accompanying drawings illustrate my invention.

Figure 1 is a plan of mechanism embodying my invention; Fig. 2, an end elevation; Fig. 3, a section on line 3 3 of Fig. 1; Fig. 4, a detail plan of a portion of the parts shown in Fig. 1; Fig. 5, a plan of a modified form, and Fig. 6 an elevation thereof.

In the drawings, 10 indicates a saw or cutter table, and 11 a saw or cutter of any desired form. Set in the top of the table 10 is a plate 12, provided with two pairs of apertures 13 13 and 13' 13', either pair of which is adapted to receive the lugs 14 and 14' of the main body 15 of my attachment. This body 15 is provided with a suitable guideway 16, into which is fitted a slotted finger 17, secured to the rear face of the fence 18. A threaded stud 19 is carried by a block 19' adjustable toward and from the saw within body 15 by any suitable means in order to compensate variations in the set of the saw. In the form shown in the drawings this adjustment is accomplished by means of a screw 20, threaded through the body 15 and projecting into the block 19', being held in said block by means of a pin 21, which projects into a peripheral groove formed in the inner unthreaded end of the screw in any ordinary and well-known manner.

Journaled upon the stud 19, above the upper face of the finger 17, is a disk 24, which is the same in construction and arrangement as the disk 24 shown in my Patent No. 784,699. Said disk is provided with a plurality of holes 25, arranged at varying distances from the center of the disk, the arrangement being preferably such that the first hole of the series will be one inch farther from the center of the disk than the last hole. Disk 24 is provided with a suitable knurled head 24', by means of which it may be readily turned, and mounted upon the threaded outer end of the stud 19 is a thumb-nut 26.

Formed in finger 17 at varying distances from the working face of the fence 18 is a series of holes 40, which are spaced apart a unit distance—say one inch. The holes 40 in the finger 17 are arranged to give the fence a desirable range of movement in any given position of the body 15, and the distance between the two sets of holes 13 and 13' in plate 12 is preferably equal to that range of action. For instance, in the drawings the scale is such that the range of movement of the fence on the body 15 is indicated as ten inches, and hence the holes 13' are ten inches farther from the saw 11 than the holes 13. For convenience the holes 40 are numbered from "1" to "10", and in order to save confusion when the body 15 is moved so that its lugs 14 and 14' are placed in the holes 13' I deem it advisable to provide the finger 17 with a second series of holes 40', arranged on the opposite side of the slot 17 in the same relative position as the holes 40 and numbered from "10" to "20," as indicated, the series of holes 40' being used when the body 15 is in its nearer position to the saw and the holes 40' being used when the body 15 is in its farther position relative to the saw.

The operation is readily apparent. By loosening the thumb-nut 26 plate 24 may be turned so as to bring any one of its holes into alinement with the series of holes 40, and by shifting the fence-finger 17 on the body 15 such hole may be brought into registry with any one of the holes 40, whereupon a pin 42 may be inserted to hold the parts in position, so that when the thumb-nut is tightened down the fence will be held an accurate distance from the saw.

In the construction shown in Figs. 5 and 6 the fence 50 is provided with a rearwardly-projecting finger 51, having a slot 52 and one or more series of pin-holes 53. A main body portion 55 is provided with means for attachment to the cutter-table and has a guideway 56, in which the finger 51 is slidably mounted. The body 55 is adapted to receive a clamping-screw 61, which passes through the slot 52, and thus serves to clamp the fence in any position of adjustment. Slidably mounted in slot 52 and projecting beneath the finger 51, so that it may engage the forward edge of the body 55, is a stud 57, upon the upper end of which is journaled a plate 58 similar to the plate 24 and provided with a similar series of position-finding pin-holes 59. A thumb-nut 60, mounted on the upper threaded end of the stud 57, serves to clamp the stud in any desired position of adjustment. In operation of this form the operator loosens nut 60 and then turns the plate 58 and shifts it along the finger 51 until the proper registry of pin-holes is produced, whereupon the stud 57 is clamped in position. Thereupon thumb-screw 61 is loosened and the fence shifted until the lower end of stud 57 comes into engagement with the forward edge of the body 55, when the clamping-screw 61 is tightened.

It will be readily understood that instead of the disk 24 I may substitute modified forms of plates, such as those shown in Figs. 3 and 4 of my patent heretofore mentioned, without departing from my invention. It is to be understood, also, that the structure may be used on friezers and other woodworking tools.

I claim as my invention—

1. In a fence for cutter-tables, the combination, with a main body, having a rabbeted recess on its one side and a transverse groove in its other side and a flanged block in said recess, of a fence having a finger projecting from its rear side, said finger having a sliding engagement with the groove of the main body and a set of position-finding means the different parts of said set being at varying distances from the working face of the fence, and another set of position-finding means carried by the main body and independently movable thereon, whereby any part of the position-finding set carried by the main body may be brought into registry with any part of the position-finding set carried by the fence, the arrangement being such that each change in registry involves a shifting of the fence to accomplish it, and means for holding the fence in any desired position of adjustment on the main body comprising a bolt connecting said block, the main body and the movable set of position-finding devices and a nut.

2. In a fence for cutter-tables, the combination, with a main body, of a fence having a finger projecting from substantially the center of its rear side, said finger having a sliding engagement with the main body and having a plurality of pin-holes formed therein at varying distances from the working face of the fence, a gage-plate rotatably mounted upon the main body on a pivot in the central line of said finger and provided with a plurality of pin-holes varying in distance from the center of said plate, a pin adapted to pass through any hole of the gage-plate and into any hole in the fence-finger, and means for securing the main body upon the table at different distances from the cutter, substantially as set forth.

3. In a fence for cutter-tables, the combination, with a main body, of a fence having a finger projecting from substantially the center of its rear side, said finger having a sliding engagement with the main body and having a plurality of pin-holes formed therein at varying distances from the working face of the fence, a gage-plate rotatably mounted upon the main body on a pivot in the central line of said finger and provided with a plurality of pin-holes varying in distance from the center of said plate, and a pin adapted to pass through any hole of the gage-plate and into any hole in the fence-finger.

In witness whereof I have hereunto set my hand and seal, at Indianapolis, Indiana, this 27th day of June, A. D. 1905.

THOMAS BEMIS. [L. S.]

Witnesses:
ARTHUR M. HOOD,
JAMES A. WALSH.